(12) United States Patent
Strope

(10) Patent No.: US 8,402,203 B2
(45) Date of Patent: Mar. 19, 2013

(54) SYSTEMS AND METHODS FOR STORING DATA IN A MULTI-LEVEL CELL SOLID STATE STORAGE DEVICE

(75) Inventor: Todd Ray Strope, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 519 days.

(21) Appl. No.: 12/650,712

(22) Filed: Dec. 31, 2009

(65) Prior Publication Data

US 2011/0161556 A1    Jun. 30, 2011

(51) Int. Cl.
*G06F 12/00* (2006.01)
(52) U.S. Cl. .................. 711/103; 711/E12.008
(58) Field of Classification Search .................. 711/103, 711/E12.008
See application file for complete search history.

(56) References Cited

U.S. PATENT DOCUMENTS

| | | | |
|---|---|---|---|
| 5,043,940 A | 8/1991 | Harari | |
| 5,671,388 A | 9/1997 | Hasbun | |
| 5,835,927 A | 11/1998 | Fandrich et al. | |
| 5,859,795 A | 1/1999 | Rolandi | |
| 6,307,807 B1 | 10/2001 | Sakui et al. | |
| 6,791,877 B2 | 9/2004 | Miura et al. | |
| 7,120,051 B2 | 10/2006 | Gorobets et al. | |
| 7,171,526 B2 | 1/2007 | Cruz | |
| 7,212,436 B2 | 5/2007 | Li | |
| 7,272,041 B2 | 9/2007 | Rahman et al. | |
| 7,304,893 B1 | 12/2007 | Hemink | |
| 7,308,525 B2 | 12/2007 | Lasser et al. | |
| 2006/0171210 A1 | 8/2006 | Nagashima et al. | |
| 2006/0245290 A1 | 11/2006 | Han et al. | |
| 2007/0025151 A1 | 2/2007 | Lee | |
| 2007/0097774 A1 | 5/2007 | Mitani | |
| 2007/0263439 A1 | 11/2007 | Cornwell et al. | |
| 2008/0140918 A1* | 6/2008 | Sutardja ........................ | 711/103 |

OTHER PUBLICATIONS

Quinnell, Richard A., "Multi-Level Cell NAND Flash—The Consumer Choice," http://www.edn.com/article-partner/CA503389.html, Feb. 2005, 4 pages.

* cited by examiner

*Primary Examiner* — Edward Dudek, Jr.
*Assistant Examiner* — John P Fishburn
(74) *Attorney, Agent, or Firm* — Alan G. Rego; Westman, Champlin & Kelly, P.A.

(57) ABSTRACT

This disclosure is related to systems and methods for storing data in multi-level cell solid state storage devices, such as Flash memory devices. In one example, a multi-level cell memory array has programmable pages, a first page having a first programming time, and a second page having a second programming time that is different than the first programming time. In one embodiment, the first programming time is faster than the second programming time. Further, a controller coupled to the multi-level cell memory array may be configured to select the first page to store the data when a priority level of a write operation indicates a first priority level and select the second page to store the data when the priority level indicates a second priority level.

22 Claims, 5 Drawing Sheets

US 8,402,203 B2

SYSTEMS AND METHODS FOR STORING DATA IN A MULTI-LEVEL CELL SOLID STATE STORAGE DEVICE

BACKGROUND

Single Level Cell (SLC) NAND Flash and Multi-Level Cell (MLC) NAND Flash may be used in solid-state data storage devices or hybrid data storage devices. However, the write performance of SLC NAND Flash may be slow and MLC NAND Flash's write performance can be even slower. Thus, improved systems and method for storing data are needed.

SUMMARY

In one example, a multi-level cell memory array has programmable pages, a first page having a first programming time, and a second page having a second programming time that is different than the first programming time. In one embodiment, the first programming time is faster than the second programming time. Further, a controller coupled to the multi-level cell memory array may be configured to select the first page to store the data when a priority level of a write operation indicates a first priority level and select the second page to store the data when the priority level indicates a second priority level.

In another example, a device comprises a multi-level cell memory array having a first logical page associated with a first physical page having a first programming time and a second logical page associated with the first physical page having a second programming time that is slower than the first programming time. The device may also include a controller coupled to the multi-level cell memory array and configured to store data associated with a write operation having a first priority level in the first logical page.

In yet another example, a computer readable medium includes instructions to cause a processor to perform a method. The method may include selecting a first page of a multi-level cell memory to store the data when a priority level of a write operation indicates a first priority level, selecting a second page of the multi-level cell memory to store the data when the priority level indicates a second priority level, and storing data associated with the write operation in the selected page.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
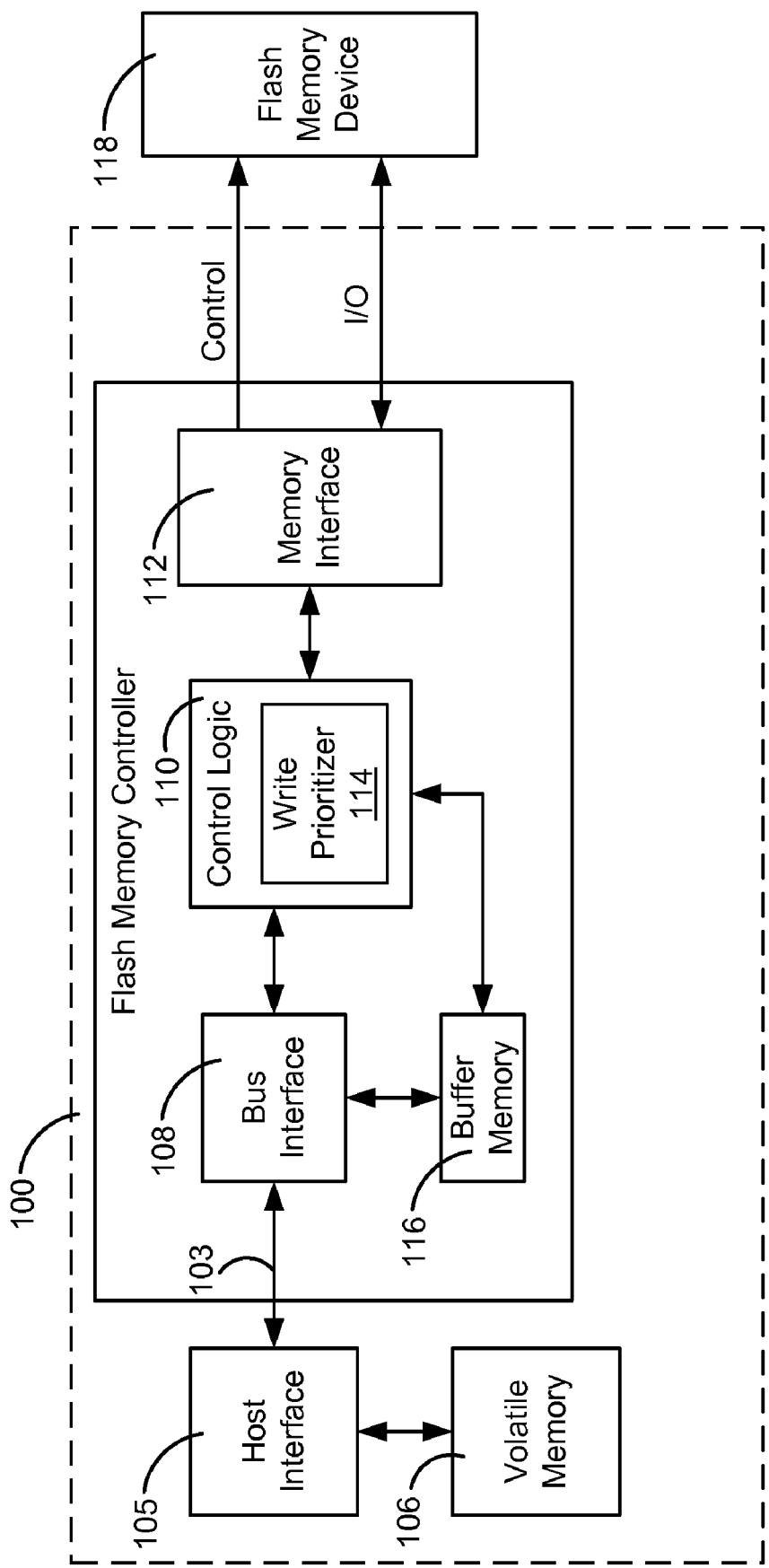
FIG. 1 is a diagram of an illustrative embodiment of a system for storing data in a multi-level cell solid state storage device.

Referring to FIG. 1, a particular embodiment of a system for storing data in a multi-level cell solid state storage device is shown and generally designated 100. The system 100 may be a data storage device, such as solid state data storage device or a hybrid data storage device. The system 100 may include a data storage controller 102 connected to a system bus 103 which also can be connected to a memory 106, which may be a random access volatile memory, such as dynamic random access memory (DRAM). The volatile memory 106 may be used to store operations received from the host, such as read requests, write requests and associated data. In a particular embodiment, the data storage controller 102 comprises a Flash memory controller.

The system 100 can contain a host interface 105 to interface the system 100 to a host (not shown). A host is defined as a system or subsystem that sends access requests to the system 100 to store or retrieve information to/from the system 100. The host interface 105 may be configured in accordance with any interface standard or specification, such as USB, IEEE 1394, Compact Flash, SATA, eSATA, PATA, SCSI, SAS, or Fiber Channel. In accordance with the interface standard being implemented, host interface 105 receives access requests from the host (e.g. read and write operations). In a particular embodiment, the data storage device 126 includes an interface connector (not shown) that permits the system 100 to be removable (i.e. disconnectable) from the host.

The data storage controller 102 can include a bus interface 108 coupled to the system bus 103, a buffer memory 116 coupled to the bus interface 108, control logic 110 coupled to the bus interface 108, and a memory array interface 112 coupled to control logic 110. The data storage controller 102 can provide intelligence and control for the memory array 118. For example, the data storage controller 102 controls foreground and background operations for write operations received from the host. Also, the data storage controller 102 can provide logic to both interface and arbitrate between the host interface 105, the bus interface 108, and the memory array interface 112.

The memory array interface 112 may be coupled via control and input/output (I/O) data lines to a memory array 118. In a particular embodiment, the memory array 118 comprises a Flash memory array, such as NAND Flash memory. The memory array 118 may be a solid state memory having multi-level cells. As used herein, a multi-level cell (MLC) is a memory element capable of storing more than a one bit of information per cell. In one example, a MLC memory may store one or more bits per cell by choosing between multiple levels of electrical charge to apply to the floating gates of its cells. Further, the memory array 118 may be organized in blocks, where each block consists of multiple pages and erasure of data can be performed on a block level, while reading and programming (i.e. writing/storing data) can be performed on a page basis. Also, in an MLC memory, some pages may have a faster programming time than other pages, as described below.

The control logic 110 may comprise software, a programmable gate array, logic circuits, discrete hardware, or any combination thereof. The control logic 110 may also include a write prioritizer 114 that may determine a priority of write requests received from the host.

During operation, the write prioritizer 114 may receive a write request for data to be stored in the memory array 118. The write prioritizer 114 may determine a priority level of a received write request, select a page to store the data when the priority level indicates a high priority level, select a second page to store the data when the priority level indicates a low priority level, and the store the data associated with the write request in the selected page. When the priority level is indicated as high, a page having a faster programming time may be selected and when the priority level is indicated as low, a page having a slower programming time may be selected.

The write prioritizer 114 may determine the priority level by checking a data map, or list, of pages that indicates whether a selected page has a fast programming time or a slow programming time. The data map may be stored in a memory, such as the buffer memory 116 or the memory 106, and may include a list of pages and an indicator of a priority level associated with each page, where the indicator of the priority level is based on a programming time associated with the associated page. In a particular embodiment, the indicator comprises a single bit and the first state (such as "1") of the single bit represents the first priority level while the second state (such as "0") of the single bit represents the second priority level, where the first priority level is associated with a faster programming time and the second priority level is associated with a slower programming time.

In another embodiment, the indicator may indicate more priority levels than just two, with each priority level being associated with a different programming speed. In yet another particular embodiment, the pages may be programmed in pairs and the data map may indicate a pair of pages that are to be programmed simultaneously based on the pages having a similar priority level. In still yet another embodiment, the data storage controller 102 may program only pages associated with a faster programming time and not programming any pages with a slower programming time. Then, the data storage controller 102 may move data from pages having the faster programming time to pages having the slower programming time in the background, such as when the data storage device 100 is not actively programming pages due to write requests from the host.

The priority level of a write request may be determined based on a type of data, an indicator from the host, an amount of the volatile memory 106 filled, an amount of the buffer memory 116 filled, a fill rate of either buffer, or any combination thereof. Further, the flash memory controller 102 may be configured to receive, via the host interface 105, an indicator of a user selectable setting to initially store all data to pages associated with a fast programming time.

The flash memory device 118 may be a memory array that comprises Multi-Level Cells (MLCs) that can store N-bits of data. In a particular embodiment, the MLCs can store 2-bits of data each. In other embodiments, the MLCs can store three, four, or possibly more bits per cell. In one example of a 2-bit MLC, within an erasure block of an MLC memory array, there may be physically half as many programming pages as are addressable within the erasure block. As such, 2-logical programming pages within the erasure block can share the same physical page. The physical cells of the 2-bit MLC may be organized as shown in FIG. 2.

Figure 2:
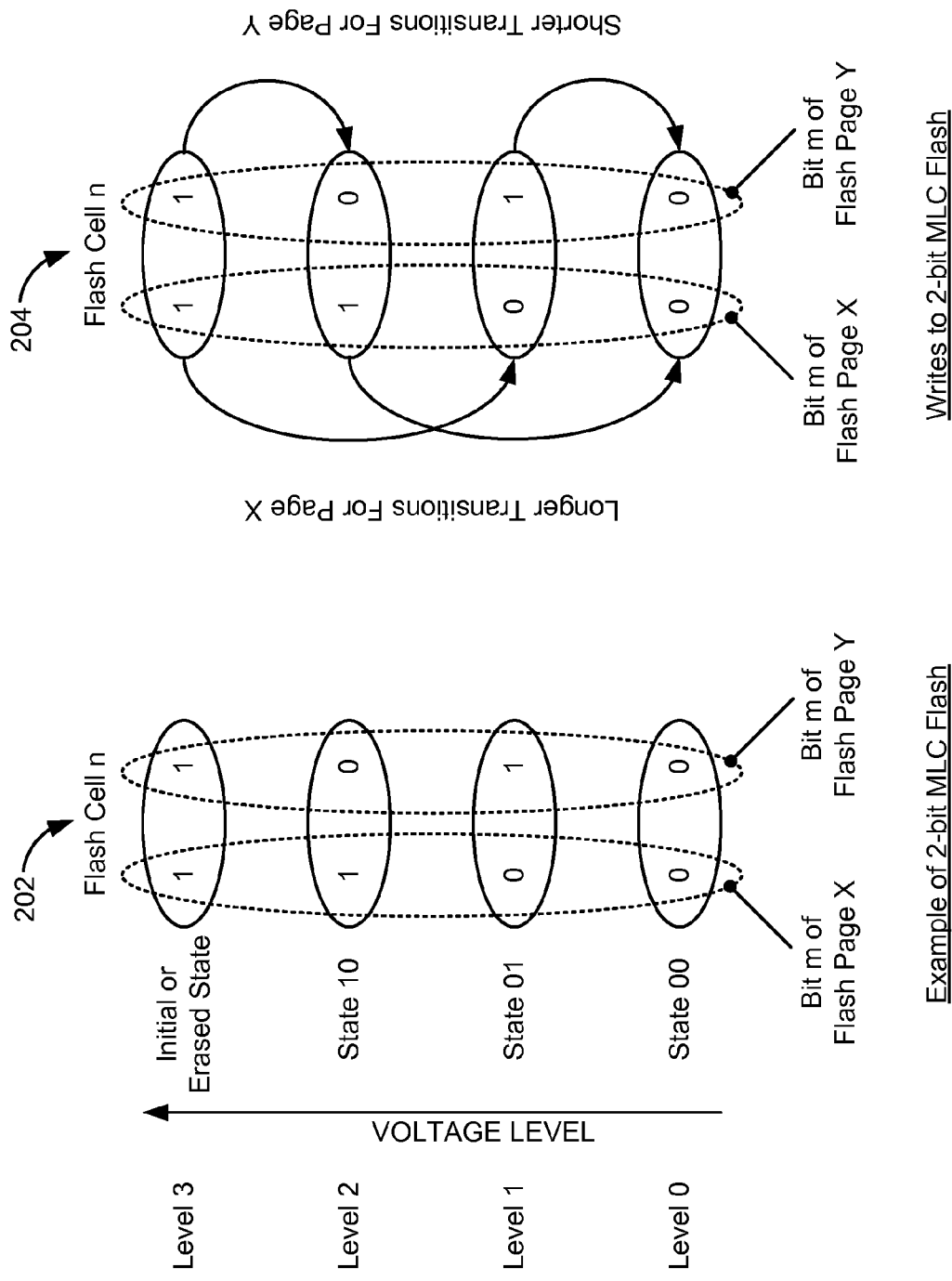
FIG. 2 is a diagram illustrating states of data stored in a multi-level cell.

FIG. 2 shows a diagram illustrating states of data stored in a multi-level cell. Example 202 shows the different states of a 2-bit multi-level cell and the associated voltage levels, which may be used in conjunction with the system 100 shown in FIG. 1. Example 204 shows the transitions that may occur when writing data to the 2-bit multi-level cell. In example 204, the transitions for page X, shown on the left side of example 304, are longer than the transitions for page Y shown on the right side of example 304. The different transitions may represent a different write times due to the required changes in various voltage levels. Due to this, some pages may have shorter programming times and some pages may have longer programming times. As a result, one of the logical pages that shares a physical programming page may program faster than the other logical page that shares the same physical programming page. Thus, within a set of logical pages that share the same physical programming page, one of the logical pages may always program faster than the other logical pages that share the same physical programming page. This may be applied to any level of MLC, such as 3-bit and 4-bit.

Figure 3:
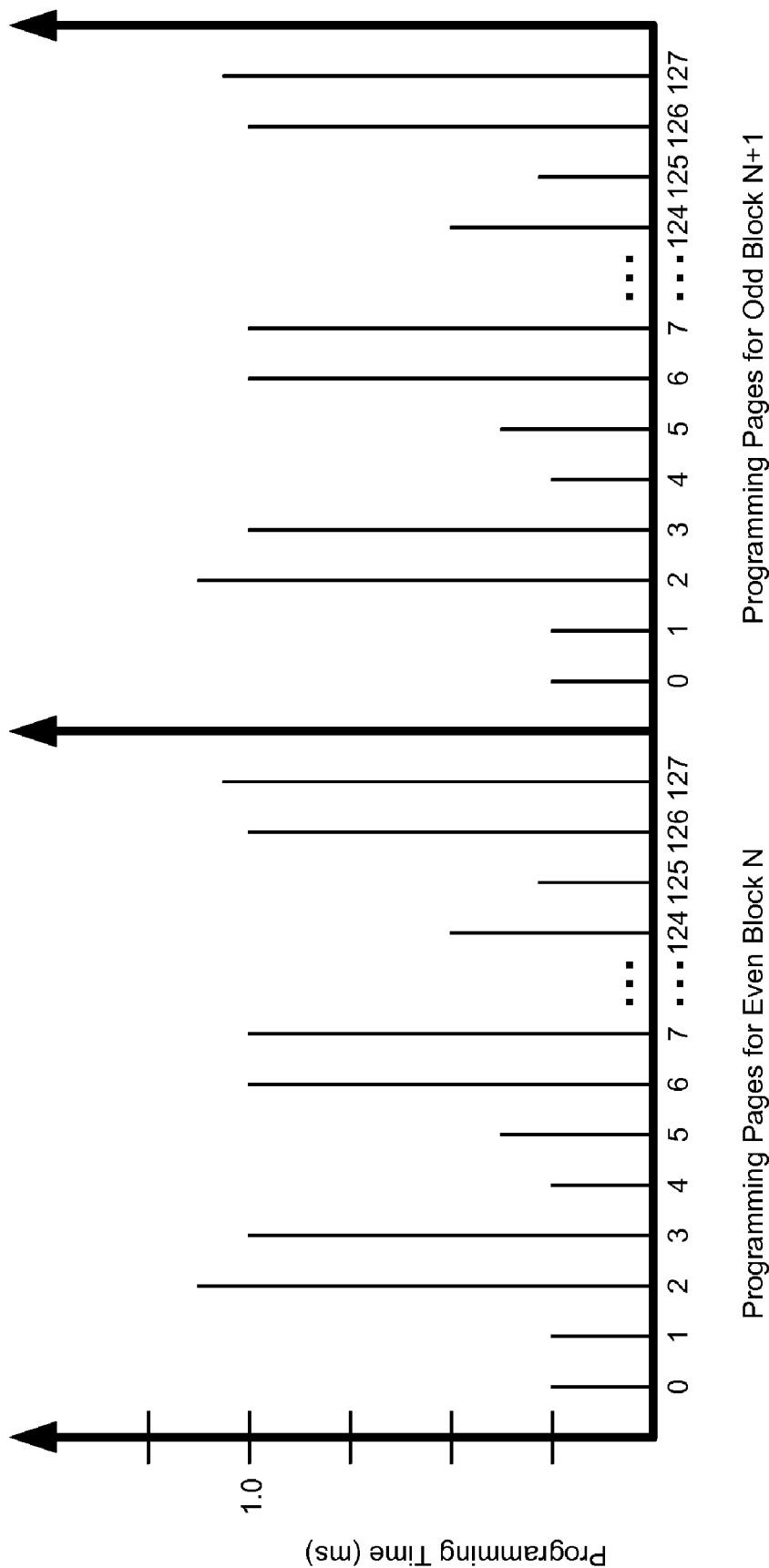
FIG. 3 is a chart representing programming times of a multi-level cell solid state storage device.

FIG. 3 shows a chart representing programming times of a multi-level cell solid state storage device. The data in the chart is test data determined during testing of the algorithms described below. As shown in the chart, some pages have shorter programming times and some pages have longer programming times. Generally, the longer programming times may be one millisecond or more and the shorter programming times may be about 250 microseconds. In testing, the faster programming pages were always were fast and the slower programming pages were always slow, respectively.

Figure 4:
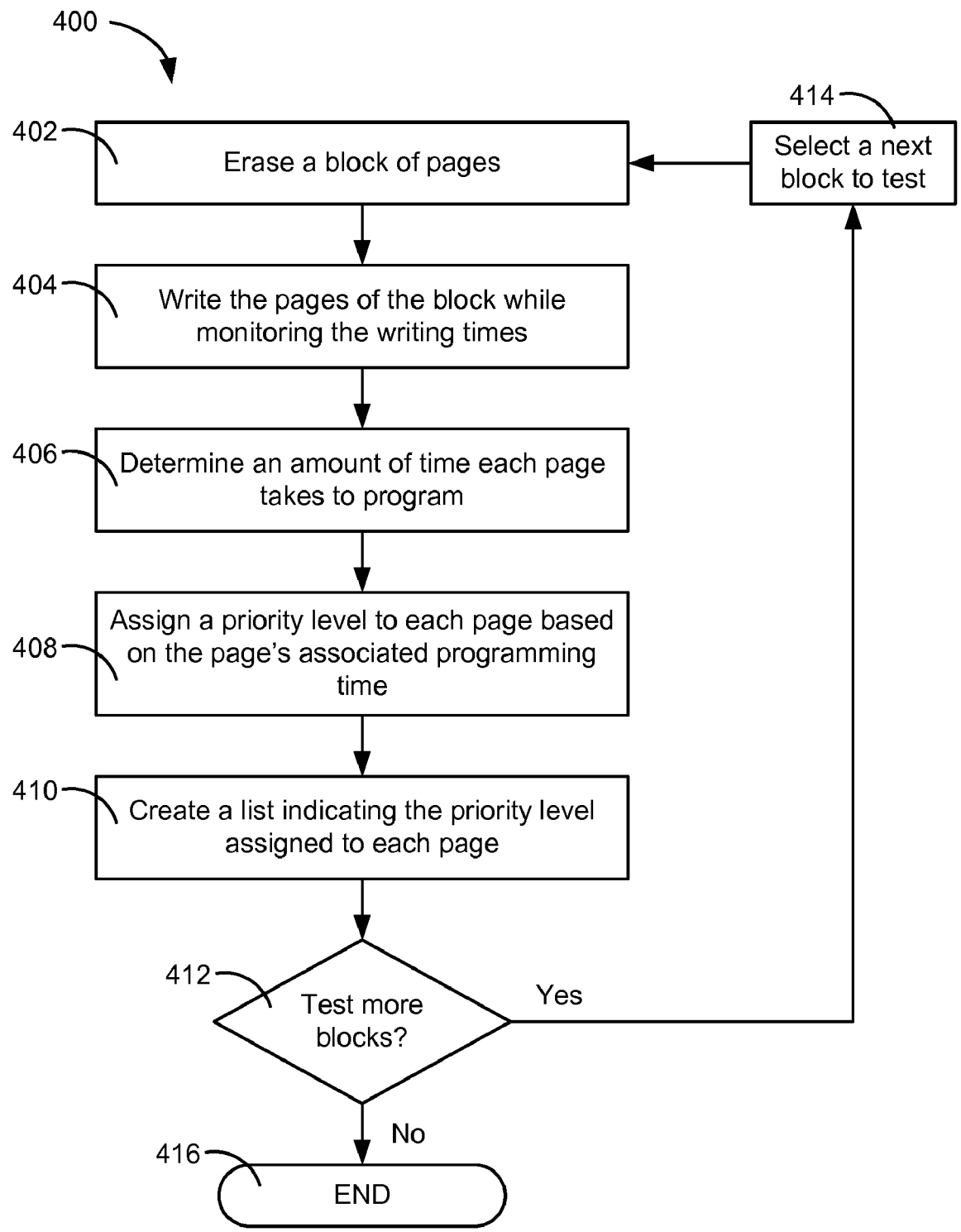
FIG. 4 is a flow chart representing a method of testing a multi-level cell solid state storage device.

Referring to FIG. 4, a flow chart representing a method of testing a multi-level cell solid state storage device is depicted and generally designated 400. The method 400 may be used to test a programming time of individual pages to determine a priority level to be assigned to each page. The method 400 may include erasing a block of pages, at 402, and programming the pages of the erased block while monitoring the writing times of each page, at 404.

The method 400 then determines an amount of time that each page used to be programmed, at 406. This may be accomplished by monitoring a busy status signal of the memory device to determine when a write is complete. For example, a ready signal may be received when a device has completed a write operation. Then, a priority level is assigned to each page based on its programming time, at 408. The method 400 then creates a data map, or list, indicating the priority level for each page, at 410. In a particular embodiment, the data map may indicate either a first priority level associated with a faster programming time or a second priority level associated with a slower programming time. Which programming times are considered faster or slower can be a design choice of each system. In addition, there may be more than two priority levels where each of the priority levels are associated with a range of programming times. The data map, or list, may be stored in a buffer memory and, in a particular embodiment, may include a single bit to indicate whether a page has a first priority level assigned to indicate a faster programming time or a second priority level assigned to indicate a slower programming time, where a first state of the single bit represents the first priority level and a second state of the single bit represents the second priority level.

After the priority levels are recorded in the list, the method 400 may determine if more blocks are to be tested, at 412. If more blocks are to be tested, a next block is selected, at 414, and the method 400 starts the testing over, at 402. If no more blocks are to be tested, the method 400 may end, at 416. In a particular embodiment, the method 400 may be executed to test each block within a multiple block memory array. In another embodiment, the method 400 may test one block pair and apply the priority levels of the tested pages to similarly aligned non-tested pages in other block pairs.

Optionally, the method 400 may also link, via a reference in the data map, a first page with another page, where both pages are designated as the first priority level, the link creating a programming pair such that the both pages in the programming pair are programmed simultaneously when programmed. The method 400 may be implemented during manufacture of a data storage device in a factory or later, such as in real-time during use of the data storage device.

Figure 5:
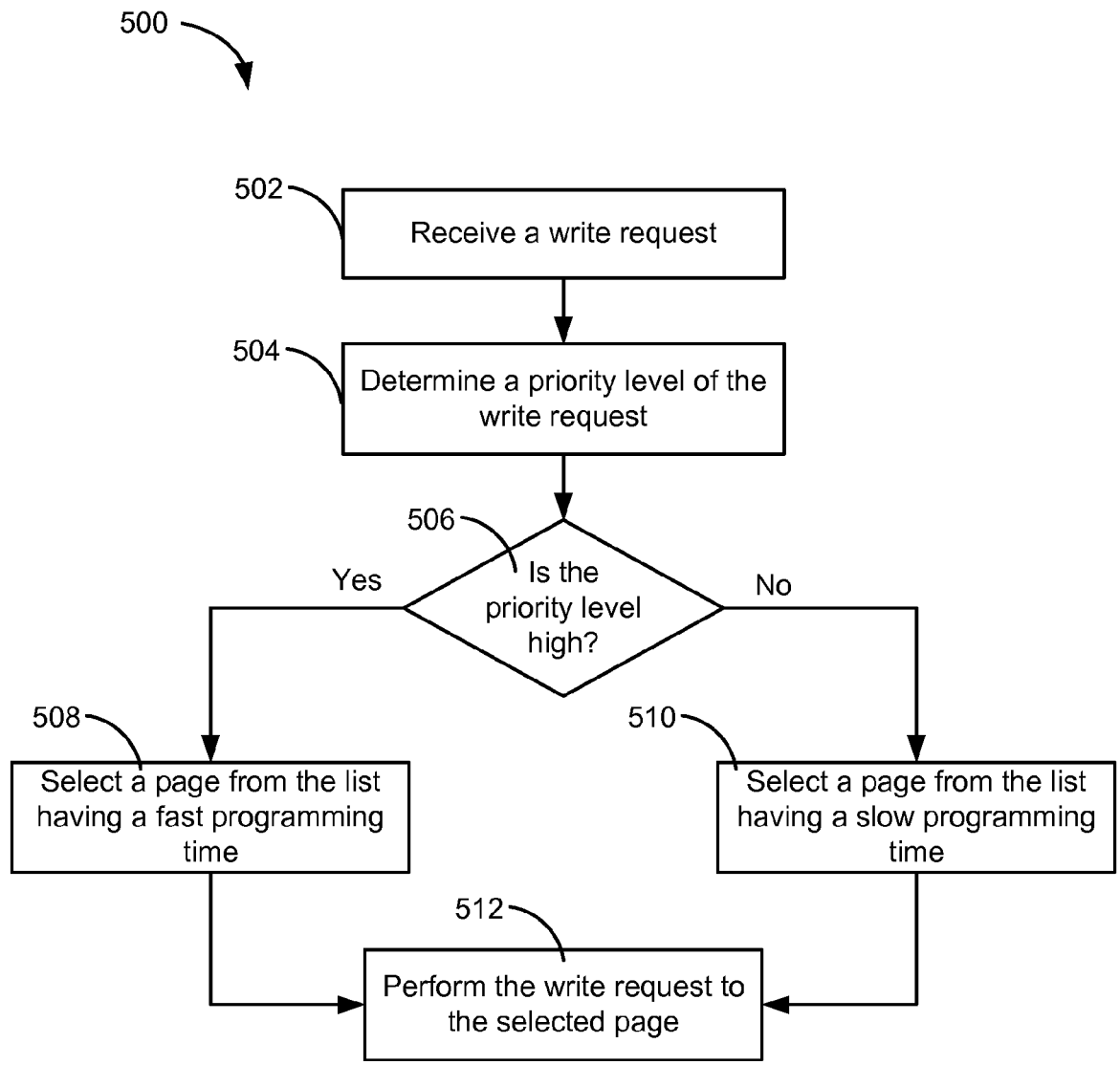
FIG. 5 is a flow chart representing a method of storing data in a multi-level cell solid state storage device.

Referring to FIG. 5, a method of storing data in a multi-level cell solid state storage device is depicted and generally designated 500. The method 500 can start when a write request to store data in a multi-level cell solid state memory is received, at 502. The write request may be received from a host or another device. The multi-level cell solid state memory may have pages that can be programmed where a first page can have a first programming time and a second page can have a second programming time that is different than the first programming time.

The method 500 then determines a priority level of the write request, at 504. The priority level of the write request may be determined based on a type of data, an indicator from the host, an amount of buffer memory filled, a fill rate of a buffer, or any combination thereof. Further, the priority level may be set via a user selectable setting that may set the priority of each write such that all data is initially stored to pages associated with a particular priority level, such as priority level associated with the fastest programming times.

A priority level decision may be made, at 506. When the priority level of the write request is a first priority level, such as a priority level associated with a faster write, a first page may be selected to store the data when the first page is associated with the first priority level via the data map, at 508. When the priority level of the write request is a second priority level, such as a priority level associated with a slower write, a second page may be selected to store the data when the second page is associated with the second priority level via the data map, at 510. Once a page is selected based on the associated priority level, the write request is performed on the selected page, at 512.

In a particular embodiment, the first programming time associated with pages having the first priority level is faster than the second programming time associated with pages having the second programming time. When a high priority write is received and the first priority level is designated as a higher priority than the second priority level, the first page is selected to store data associated with the first priority level due to the first programming time being faster than the second programming time. The second page may be selected to store data associated with the second priority level due to the second programming time being slower than the first programming time.

In a particular embodiment, all write requests may be designated as high priority write requests and all the associated data may be stored in pages associated with a high priority level that indicates a faster program time. In another embodiment, a system may write data only to faster programming pages to increase a throughput of a storage device or increase the reliability of newly written data. In these cases, the data may not be stored in any pages with a low priority level that indicates a slower program time. The data may be coalesced and moved at a later time from the pages having the high priority level to pages having the low priority level when the data storage device is not busy, such as during background operations or when the data storage device is not actively programming pages due to write requests from the host. In addition, cleanup and garbage collection operations could be run in the background to move high priority write request's data from the faster programming pages to other memory locations.

It is to be understood that even though numerous characteristics and advantages of various embodiments have been set forth in the foregoing description, together with details of the structure and function of the various embodiments, this disclosure is illustrative only, and changes may be made in detail, especially in matters of structure and arrangement of parts. For example, the embodiments described herein can be implemented for any type of data storage device that includes certain areas of a data storage medium that can be programmed faster than other areas, such as Flash memory. Further, the methods describe herein may be implemented by a computer processor, controller, or a hardware control circuit. Also, the particular elements may vary depending on the particular application for the data storage system while maintaining substantially the same functionality without departing from the scope and spirit of the present disclosure. In addition, although an embodiment described herein is directed to a hybrid data storage system including a disc data storage medium and at least one solid-state data storage medium and having a distributed media cache, it will be appreciated by those skilled in the art that the teachings of the present application can be applied to any type of data storage device that may benefit from the ideas, structure, or functionality disclosed herein.

What is claimed is:

1. A device comprising:
a first memory adapted to store a map that includes a list of pages of a multi-level cell solid state memory and an indicator of a priority level associated with each of the pages, each indicator of the priority level in the map being one of at least two different priority levels that correspond to two different page programming times; and
a controller configured to:
receive a write request for data to be stored in a multi-level cell solid state memory;
determine a priority level of the write request;
select a page of the pages based on the indicator associated with the page in the list of pages and based on the determined priority level of the write request; and
store at least a portion of the data associated with the write request in the selected page.

2. The device of claim 1 wherein the at least two different priority levels comprise a first priority level and a second priority level, and wherein the pages of the multi-level cell solid state memory comprise at least a first page having a first programming time of the two different page programming times and a second page having a second programming time of the two different page programming times, and wherein, in the map, the first page is associated with the first priority level and the second page is associated with the second priority level, and wherein the controller is further configured to:
select the first page based on the indicator associated with the first page when the priority level of the write request indicates a first priority level;
select the second page based on the indicator associated with the second page when the priority level of the write request indicates a second priority level.

3. The device of claim 2 wherein the first programming time is faster than the second programming time, the first priority level in the map is designated as higher than the second priority level in the map, and the first page is selected to store data associated with the first priority level of the received write request due to the first programming time being faster than the second programming time.

4. The device of claim 1, and further comprising a host interface, wherein the controller is configured to receive the write request from a host device through the host interface.

5. The device of claim 2 further comprising the controller adapted to generate the map by determining, for each of the pages, the first programming time or the second programming time and storing the respective indicator of the priority level based on the determination of the first programming time or the second programming time in the map.

6. The device of claim 5 wherein determining the first programming time or the second programming time comprises programming a respective page of the pages and measuring an amount of time for programming the respective page.

7. The device of claim 2 further comprising determining an amount of time for programming for each of the pages of the multi-level solid state memory and selecting the indicator of the priority level to be stored in the map for each page based on the amount of time.

8. The device of claim 7 wherein the indicator of the priority level in the map comprises a single bit, where a first state of the single bit represents the first priority level and a second state of the single bit represents the second priority level.

9. The device of claim 7 further comprising more than two priority levels and the indicator comprises more than one bit.

10. The device of claim 2, wherein the multi-level cell solid state memory comprises a cell configured to store more than one bit of information in a given physical programming page, and wherein the first page comprises a first logical page addressed to the given physical programming page and the second page comprises a second logical page addressed to the given physical programming page.

11. The device of claim 10, wherein the controller is configured to store the at least a portion of the data by:
    using the given physical programming page in the multi-level cell solid state memory by applying a first voltage to the given physical programming page, when the first page is selected; and
    using the given physical programming page in the multi-level cell solid state memory by applying a second voltage, that is different than the first voltage, to the given physical programming page, when the second page is selected.

12. The device of claim 1 wherein the multi-level solid state memory comprises multi-level cell (MLC) NAND Flash memory.

13. The device of claim 2 further comprising storing data for a plurality of write requests other than the received write request only in those of the pages associated with the first priority level in the map and not storing the data for the plurality of write requests in those of the pages associated with the second priority level in the map.

14. The device of claim 13 further comprising moving data from those of the pages associated with the first priority level in the map to pages associated with the second priority level in the map during background operations of the device.

15. The device of claim 1 wherein the priority level of the received write request is determined based on a type of data, an indicator from the host, an amount of buffer space filled, or a fill rate of a buffer.

16. The device of claim 2 further comprising the controller adapted to receive an indicator of a user selectable setting to initially store all data to those of the pages associated with the first priority level in the map.

17. A non-transitory storage medium storing instructions to cause a processor to perform a method comprising:
    storing a list of pages and an indicator of a priority level associated with each page, the pages including at least first and second pages of a multi-level cell memory;
    receiving a request for a write operation;
    determining a priority level of the write operation;
    selecting the first page based on the indicator associated with the first page when the priority level of the write operation indicates a first priority level;
    selecting the second page based on the indicator associated with the second page when the priority level of the write operation indicates a second priority level; and
    storing the data associated with the write operation in the selected page.

18. The non-transitory storage medium of claim 17 wherein the first page has a first programming time, and the second page has a second programming time that is slower than the first programming time.

19. The non-transitory storage medium of claim 17 having instructions to cause a processor to perform the method further comprising:
    generating the list of the pages by determining an amount of time for programming for each page of at least one even block and one odd block of the multi-level cell memory and selecting the indicator of the priority level to be stored for each of the pages based on the amount of time.

20. The non-transitory storage medium of claim 17, wherein storing comprises:
    using a given physical programming page in the multi-level cell memory to store the data by applying a first voltage to the given physical programming page, when the first page is selected to store the data; and
    using the given physical programming page in the multi-level cell memory to store the data by applying a second voltage, that is different than the first voltage, to the given physical programming page, when the second page is selected to store the data.

21. The non-transitory storage medium of claim 20, wherein the given physical programming page comprises a cell of the multi-level cell memory configured to store more than one bit of information.

22. The non-transitory storage medium of claim 21, wherein the first page comprises a first logical page addressed to the given physical programming page and the second page comprises a second logical page addressed to the given physical programming page.

* * * * *